June 26, 1951  G. E. KING  2,558,094

REACTOR CONTROLLED ADJUSTABLE SPEED DRIVE

Filed March 31, 1948

WITNESSES:
E. A. M'Closkey.
New. L. Groome

INVENTOR
George E. King.
BY C. M. Avery
ATTORNEY

Patented June 26, 1951

2,558,094

UNITED STATES PATENT OFFICE 2,558,094

REACTOR CONTROLLED ADJUSTABLE SPEED DRIVE

George E. King, Edgewood, Pa., assignor to Westinghouse Electric Corporation, East Pittsburgh, Pa., a corporation of Pennsylvania Application March 31, 1948, Serial No. 18,207

4 Claims. (Cl. 318—347)

My invention relates to control systems for adjusting and regulating the speed of a direct current motor, and more particularly to motor control systems which include a saturable reactor of controlled premagnetization as a controlling, regulating and amplifying element.

It is an object of my invention to provide a system for energizing a direct current motor from an alternating current supply by means of speed controlling and regulating devices or circuits of utmost simplicity while securing a high accuracy and a wide range of speed control.

Another object of the invention is to devise the system in such a manner that, aside from the motor to be controlled, only static apparatus, as contrasted with rotating machinery or vibratory regulators, are used for energizing, controlling and speed-regulating the drive.

Figure 1:
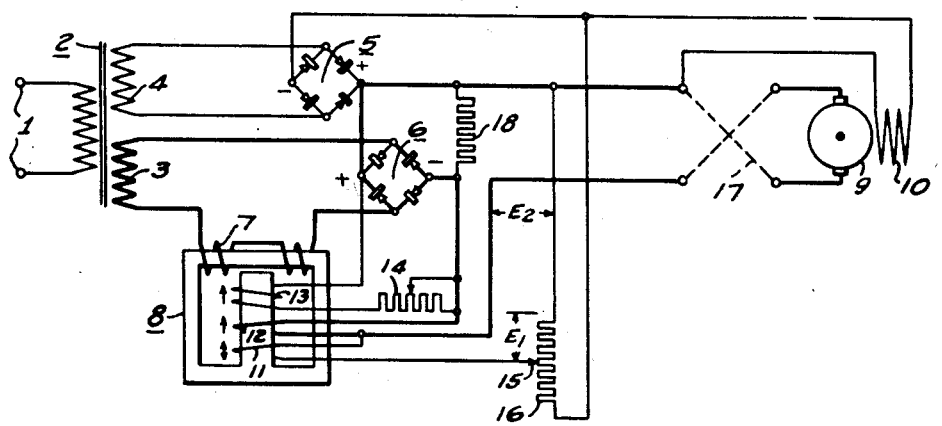
Figure 2:
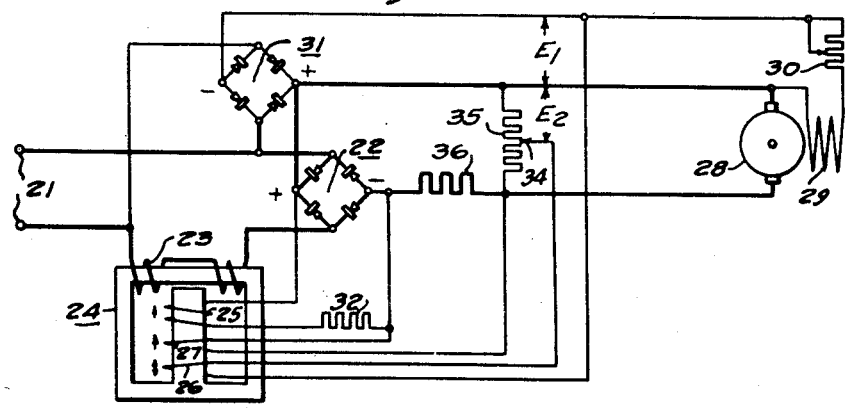

According to my invention, I energize a direct current motor by adjustable voltage through a rectifier whose input terminals are connected to an alternating current supply in series with the reactance winding of a saturable reactor, and I premagnetize the reactor in a controlled degree by means of direct current coils which are attached to the armature circuit of the motor and to a separate source of adjustable direct current voltage in the manner apparent from the following description of the two embodiments of adjustable speed drives represented in Figs. 1 and 2, respectively, of the drawing.

The drive system diagrammatically shown in Fig. 1 is energized from alternating current supply terminals 1 through a transformer 2 with two secondary windings 3 and 4. Winding 4 is connected across the input terminals of a rectifier 5 which provides a rectified output voltage of substantially constant voltage. Winding 3 is connected across the input terminals of another rectifier 6 in series with the main reactance winding 7 of a saturable reactor 8. The output voltage of rectifier 6 is substantially proportional to the alternating-current voltage impressed across the input terminals of the rectifier, and this alternating-current voltage varies in accordance with the reactive impedance of winding 7. The output terminals of rectifier 6 are connected to the armature 9 of the motor to be controlled. The field winding 10 of the motor is connected across the output terminals of rectifier 5 and therefore energized by normally constant voltage. If desired, a field rheostat may be provided in the circuit of the motor field winding 10.

The saturable reactor is shown to have a three-legged core, although it will be understood that saturable reactance devices of different design, such as two interconnected reactors with undivided magnetic circuits, may be employed instead. The main winding 7 of reactor 8 has equal numbers of turns inductively associated with the two respective outer legs of the core so that substantially no flux is inducted by winding 7 in the center leg of the core. The center leg is equipped with direct-current coils 11, 12 and 13. Coil 13 is connected across the output terminals of rectifier 6 and its circuit is preferably equipped with a calibrating rheostat 14. Coil 13 operates as a feed-back winding which premagnetizes the reactor core in a degree proportional to the output voltage of rectifier 6. The magnitude of the feed-back premagnetization is so adjusted, for instance, by means of the rheostat 14, that the excitation of coil 13 provides a large proportion of the premagnetization needed for reactor 8 to maintain the reactance of winding 7 at the value at which the output voltage of rectifier 6 corresponds to desired motor speed. For instance, the excitation of winding 13 may be such that it provides almost but not quite all of the premagnetization required for the just-mentioned operating condition. Then, the other direct current coils of the reactor are only called upon to jointly provide the slight additional premagnetization needed for a given operating condition of winding 7, i. e. for a given output voltage of rectifier 6. As a result, slight voltage changes in the circuits of coils 11 and 12 suffice to produce proportionately much larger changes in the output voltage of rectifier 6. In other words, the just-mentioned operating conditions involve a high amplification factor of the saturable reactance device.

Coil 11 represents the main control coil of the reactor while coil 12 serves a corrective purpose. Coil 11 is connected to the slider or tap 15 of a potentiometric rheostat 16 which is connected across the output terminals of rectifier 5 and therefore energized by substantially constant voltage. The circuit of coil 11 is also connected across the armature circuit of the motor. Consequently, two component control voltages are effective in the circuit of coil 11. One of these control voltages has a normally constant and adjusted value $E_1$ (pattern voltage) and is taken from the tapped off portion of rheostat 16. This voltage $E_1$ and therefore the selected position of slider 15 determine the speed at which the motor is supposed to run. The second component control voltage (pilot voltage) impressed on the circuit of coil 11 corresponds to the voltage $E_2$ across the armature terminals of the motor. The pattern voltage $E_1$ and the pilot voltage $E_2$ oppose each other. Consequently, the excitation of control coil 11 is in accordance with the differential value of the two voltages. The two voltages balance each other to a large extent when the speed of the motor corresponds to the setting of the slider 15.

The coil 12 is connected to the armature circuit of the motor so that its excitation is proportional to the current flowing in the armature circuit. The premagnetization caused by coil 12 is cumulative to the premagnetizing effect of the pattern voltage $E_1$ and in opposition to the magnetizing effect of the pilot voltage $E_2$. Coil 12 may be considered to have the effect of imposing a modifying or corrective effect on that of the pattern voltage. The premagnetization due to the coil 13 is also cumulative to the effect of the pattern voltage $E_1$.

Reversing switch means are schematically indicated at 17 in order to permit running the motor in either direction. The reversing means may consist of a pair of reversing contactors with associated control circuits as customary in motor control systems. A ballast resistor may be used as shown at 18.

Assuming the switch means 17 to be closed for a given running direction of the motor and the slider 15 of the speed adjusting rheostat 16 set for a desired motor speed, the application of energizing voltage to terminals 1 has the effect of simultaneously exciting the motor field winding 10, the rheostat 16 and the rectifier 6. At first, the magnet core of the reactor is substantially unsaturated so that the reactance of winding 7 is high. Consequently, the voltage applied from rectifier 6 to the motor armature 9 is at first low and the excitation of control coil 11 is predominantly determined by the pattern voltage $E_1$. The premagnetization caused thereby reduces the reactance of winding 7 so that the output voltage of rectifier 6 builds up and causes the motor to accelerate. As the rectifier voltage or armature terminal voltage builds up, the excitation of the control winding 11 decreases due to the differential effect of the pilot voltage $E_2$ and the effect of the feed-back coil 13 also increases, until the pilot voltage $E_2$ nearly matches the pattern voltage $E_1$. At that point, the feed-back winding 13 supplies most of the magnetization required for that setting of the rheostat 16. Should the rectifier or motor terminal voltage increase beyond the desired value, the differential excitation of the control coil 11 is reversed, causing it to buck the feed-back coil 13 and to reduce the rectified armature voltage to the proper amount. Should the rectified voltage decrease below the proper value, the excitation of coil 11 increases in the direction determined by the polarity of the pattern voltage $E_1$. This causes the voltage of rectifier 6 to increase back to the desired value. In this manner the reactor system operates to hold the motor speed substantially at the value determined by the selected setting of slider 15, and any change in the adjustment of slider 15 changes the motor speed accordingly.

The foregoing control performance would secure accurate proportionality between the setting of slider 15 and the speed of the motor only if the motor load current remained constant. Consequently, an inaccuracy would have to be put up with if the corrective control coil 12 were not provided. This control coil increases the amount of premagnetization of the reactor with increasing load, and, consequently, reduces the reactance of winding 7 and increases the output voltage of rectifier 6 to the value necessary to compensate for the drop in speed otherwise caused by the increasing load current. In other words, the coil 12 takes care of providing the speed control with IR drop compensation.

In the embodiment according to Fig. 2, the alternating current terminals 21 of the drive system are connected to the input terminals of a rectifier 22 in series with the main reactance winding 23 of a saturable reactor 24 equipped with a feed-back coil 25 and two control coils 26 and 27.

The motor to be controlled has its armature 28 energized from the output terminals of the rectifier 22. The motor field winding 29 is excited through a field rheostat 30 from a rectifier 31 which is also energized from the alternating current terminals 21 and provides a voltage of substantially constant magnitude.

The feed-back coil 25 is connected across the output terminals of rectifier 22 in series with a resistor 32. The circuit of control coil 26 is connected between the negative output terminal of the rectifier 31 and the slider 34 of a speed adjusting rheostat 35. This rheostat is connected across the motor armature circuit. Consequently, the circuit of coil 26 is excited by the differential value of two mutually opposing voltages. One voltage ($E_1$) is taken from across the output terminals of rectifier 31 and has a constant value. The other voltage ($E_2$) is taken from the tapped-off portion of the rheostat 35, and this voltage varies in proportion to the motor terminal voltage or the output voltage of rectifier 22. The IR-drop compensating coil 27 is connected across a resistor 36 series-connected in the armature circuit so that the voltage drop across a resistor 36 is proportional to the load current or IR drop of the armature circuit.

The performance of the system is basically the same as the above-described operation of the system shown in Fig. 1. However, it will be recognized from Fig. 2 that systems according to the invention can be modified as regards individual circuit elements and appertaining connections without departing from the objects and advantages of the invention and within the essential features of the invention as defined in the claims annexed hereto.

I claim as my invention:

1. An adjustable-speed drive, comprising a direct current motor having an armature circuit and a field winding, alternating current supply terminals, a rectifier and a saturable reactor series-connected between said supply terminals, said rectifier being connected to said armature circuit to provide direct current voltage therefor, said reactor having premagnetizing direct-current coil means for controlling said rectifier to vary said voltage, another rectifier connected to said supply terminals to provide rectified voltage of substantially constant magnitude, said field winding being connected to said second rectifier, a potentiometric rheostat connected across said other rectifier and having a selectively adjustable tapped portion connected across said armature circuit in series with said coil means so as to provide said coil means with control voltage determined by two mutually differential voltage drops caused across said tapped rheostat portion due to said rectified constant voltage and due to the motor terminal voltage respectively.

2. An adjustable-speed drive, comprising a direct current motor having an armature circuit and a field winding, alternating current supply terminals, a saturable reactor having a main winding and three premagnetizing direct-current coils, a rectifier having input terminals connected to said supply terminals in series with said main winding and having output terminals connected across said armature circuit, one of said coils being connected to said output terminals to provide said reactor with premagnetizing feed-back excitation, another rectifier connected to said supply terminals to provide rectified voltage of substantially constant magnitude, said field winding being connected to said second rectifier, a potentiometric rheostat connected across said other rectifier and having a selectively adjustable tap to provide adjustable voltage, another one of said coils having a coil circuit connected through said tap and in series with part of said rheostat across said armature circuit so as to be impressed by the difference between the motor terminal voltage and said adjustable voltage, whereby said motor is controlled to run at a speed approximately proportional to said pattern voltage, and said third coil being connected to said armature circuit to provide corrective premagnetization dependent upon the current flowing in said armature circuit and cumulative to the premagnetization caused by said adjustable voltage, said first coil being poled for premagnetization also cumulative to that of said pattern voltage.

3. An adjustable-speed drive, comprising a direct-current motor having an armature circuit, alternating-current supply means, a rectifier and a saturable reactor series-connected with each other across said supply means, said rectifier having output terminals connected to said armature circuit to provide direct-current voltage therefor, said reactor having premagnetizing direct-current coil means for controlling said rectifier to vary said voltage, another rectifier connected across said supply means and having direct-current output terminals, respective output terminals of the same polarity of said two rectifiers being connected with each other, a control circuit extending between the other respective terminals of said two rectifiers and in series through said coil means, and a tapped potentiometric rheostat connected between the output terminals of one of said rectifiers and having a selectively adjustable portion series-connected in said control circuit.

4. An adjustable-speed drive, comprising a direct-current motor having an armature circuit and a field winding, alternating-current supply terminals, a saturable reactor having a main winding of variable reactance and coil means for controlling said reactance, a rectifier having input terminals connected to said supply terminals in series with said main winding and having output terminals connected across said armature circuit to provide energizing voltage therefor, said reactor having a feed-back coil connected across said output terminals, another rectifier having input terminals connected to said supply means and output terminals connected to said field winding to provide constant excitation to said winding, respective output terminals of the same polarity of said two rectifiers being connected with each other, a control circuit extending between the other respective terminals of said two rectifiers and in series through said coil means, and a tapped potentiometric rheostat connected between the output terminals of one of said rectifiers, and having a selectively adjustable portion series-connected in said control circuit.

GEORGE E. KING.

REFERENCES CITED

The following references are of record in the file of this patent:

UNITED STATES PATENTS

| Number | Name | Date |
| --- | --- | --- |
| 1,426,123 | Stoekle | Aug. 15, 1922 |
| 1,834,416 | Osgood | Dec. 1, 1931 |
| 1,963,093 | Logan | June 19, 1934 |
| 2,082,496 | Howe | June 1, 1937 |
| 2,086,594 | Young | July 13, 1937 |
| 2,179,299 | Murcek | Nov. 7, 1939 |